April 4, 1950    L. A. BENOIST ET AL    2,503,022
PALLET
Filed Sept. 28, 1946    2 Sheets-Sheet 1
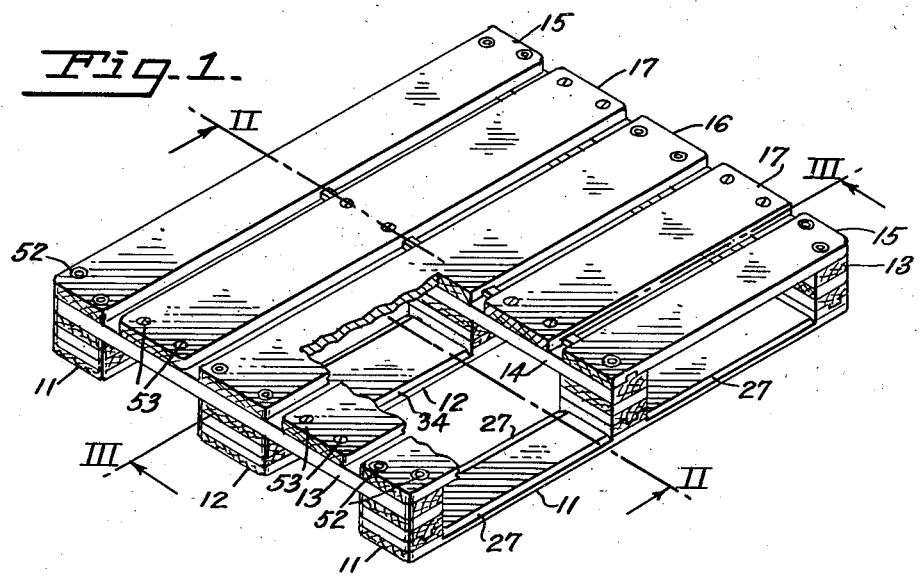
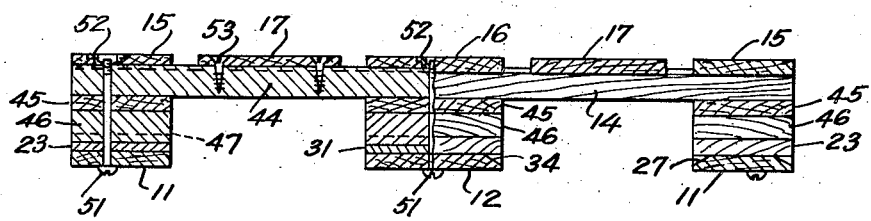
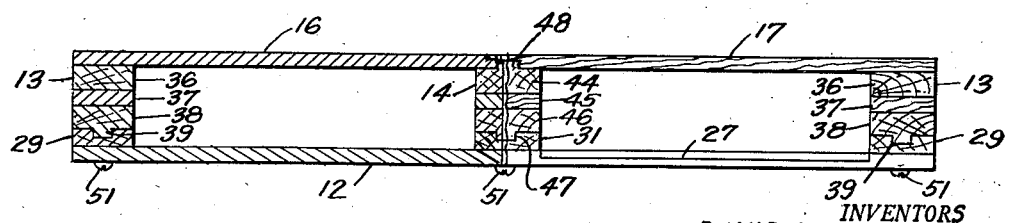
INVENTORS
DAVID I. PURSLEY
LOUIS A. BENOIST
BY
ATTORNEY April 4, 1950     L. A. BENOIST ET AL     2,503,022
PALLET Filed Sept. 28, 1946     2 Sheets-Sheet 2

INVENTORS
DAVID I. PURSLEY
LOUIS A. BENOIST
BY
ATTORNEY

Patented Apr. 4, 1950

2,503,022

UNITED STATES PATENT OFFICE 2,503,022

PALLET

Louis A. Benoist, San Francisco, and David I. Pursley, Atherton, Calif., assignors, by mesne assignments, to Lawrence Universal Pallet Corporation, Wilmington, Del., a corporation of Delaware Application September 28, 1946, Serial No. 699,992

3 Claims. (Cl. 248—120)

This invention relates to an improved pallet for loading, shipping, and storing articles.

Instead of individually loading and stacking each box, sack, crate, etc., the modern practice is to stack a number of articles on a raised platform, known as a pallet, and to treat each loaded pallet as a unit. Next the spaced, horizontally-projecting forks of a lift truck are inserted beneath the pallet, and the unit lifted, moved to the desired location, and deposited there. At each stage of loading, unloading, stacking and restacking, much time is saved by this economical method of lifting, and it is now a common sight to see fork lift trucks loading railroad freight cars, trucks, ships with pallet-borne goods, or stacking loaded pallets in warehouses on docks, etc. One man with a fork lift truck and loaded pallets can accomplish more than many men working in the old-fashioned stevedore methods.

The pallets themselves have rigid requirements. Since they carry heavy loads—frequently more than a ton per pallet—they must be made from strong materials. Since they add to the weight being shipped or stored, they must nevertheless be light in weight. Since they are subject to rough treatment by manual handling and by inexperienced operators of fork lift trucks; as well as all the strains imposed by motion of the transporting vehicle—of trucks on bumpy roads, of swaying railroad cars, and of tossing ships—pallets must be put together firmly and be able to withstand shock as well as the load. It is also desirable that they not take up much room when being shipped empty. Also, frequently one part of a pallet is broken and the rest left intact; the pallet is useless in this partly damaged condition and unless the damaged part can be replaced economically, the whole pallet must be discarded. Moreover it is very desirable to have a pallet approachable by a pallet handling device from any of its four sides. Such pallet handling devices may be a power driven fork truck or a hand truck.

In spite of these rigid requirements most pallets heretofore made have consisted merely of a number of assorted planks nailed to three two-by-fours. This has resulted in great waste and inefficiency.

One object of this invention is to provide a pallet made up of a small number of easily assembled specially cut interlocking stock parts. Damaged parts can be easily replaced and the pallet made as good as new.

Another object of the invention is to provide a pallet which will be light in proportion to its strength, highly resistant to shock, and durable.

Another object of the invention is to provide a pallet which is particularly well suited to being handled by fork lift trucks and hand lift pallet trucks; to provide a pallet which can be approached by the loader and lifted from any of its four sides, so that the pallet loads can be readily loaded into all types of transportation equipment; to provide a pallet which will reduce the likelihood of damage to the loader's forks or to the loader, even when carelessly handled; to provide a pallet which will have great resistance to "racking"—that is, to change in shape from a rectangle to a diamond-shaped rhomboid—with resultant damage to the pallet.

Another object of the invention is to provide a pallet which can be nested in pairs so as to conserve freight space when being stored or being transported empty.

Further objects and advantages of this invention will be apparent from the specification and the accompanying drawings which illustrate the preferred embodiment of the invention.

Fig. 1 is an isometric view of the preferred form of pallet, part of the top being cut away;

Fig. 2 is a section thereof on line II—II of Fig. 1;

Fig. 3 is a section taken on line III—III of Fig. 1.

Figure 4:
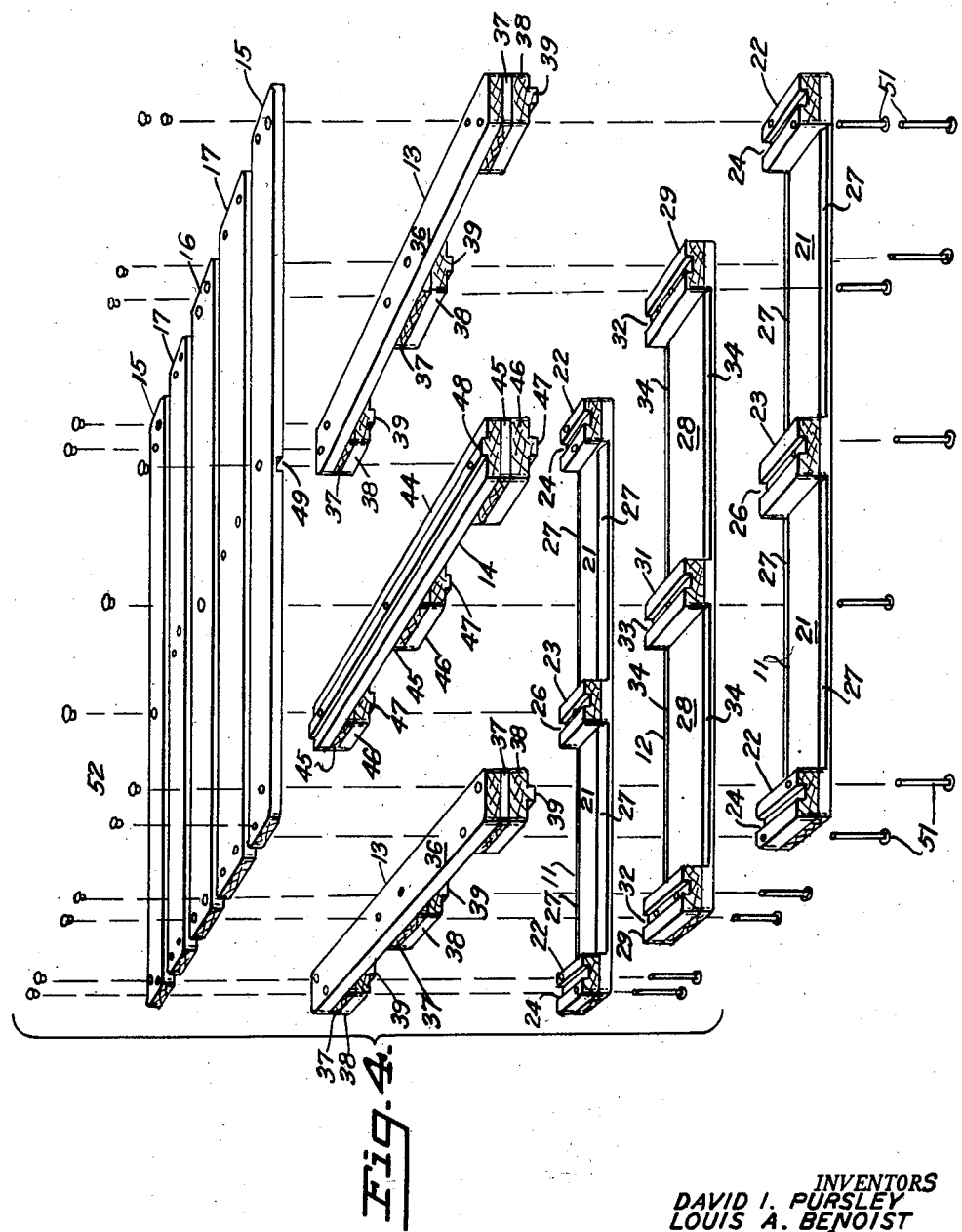
Fig. 4 is an exploded view of the pallet of Fig. 1, showing the various stock parts.

The seven stock pieces or parts from which complete pallets of the preferred type can be assembled or parts thereof replaced are designated 11, 12, 13, 14, 15, 16 and 17, a plurality of some of these parts being present in the complete assembly. See Fig. 4.

There are two outside bottom boards or base end members 11 and an intermediate bottom board or base member 12. To these bottom boards 11 are glued vertical spacing blocks 22 and 23 with the grain of each block crossing the grain of the bottom board. The spacing blocks 29 and 31, strengthen the middle bottom board 12. The laminating prevents the splitting of the bottom boards, one of the most vulnerable parts of any pallet. The cross blocks 22, 23, 29 and 31 are grooved at 24, 26, 32 and 33 respectively to interlock with adjacent parts carried on the stringers.

The two outside stringers or cross-members 13 and the inside stringer 14 are constructed by gluing spacing blocks 37, 38 and 45, 46 respectively to the long boards 36 and 44. The blocks are set with the grain crossed and this gives the stringers great resistance to splitting. Splines 39 and 47 engage the grooves 24, 32, 26 and 33 in the bottom board blocks.

The long spline or tongue 48 in the middle stringer 14 engages in the dado 49 in the center of the top boards 15, 16 and 17. The interlocking of these tongues effectively prevents the racking of the pallet whenever it is dropped on one corner. The glued cross grained blocks on the bottom boards and the stringers effectively prevent the splitting of these parts when the racking strain occurs.

The top boards 15, 16 and 17 form the load supporting platform and are spaced well above the bottom boards 11 and 12 so that the forks on the lifting trucks can gain entrance without difficulty. These top boards may be made of wood, plastic, steel, aluminum, or a combination of a number of different materials. The bottom boards 11 and 12 have their center sections 21 and 28 between the blocks beveled at 27 and 34 as a further aid in guiding the lifting forks in between the top and bottom boards. Some lifting trucks have casters on the forward end of the lifting means and these beveled faces 27 and 34 make it easier to insert these trucks under the load.

The tongues and grooves or anchoring means with which the various parts are provided are also very useful in placing the parts in their proper relative positions when assembling them or when replacing a part.

Once assembled, the parts are held together by fastening means preferably comprising special bolts 51, with special nuts 52. These fastening means extend through from the bottom board to the top board. Short screws 53 are sufficient to hold the top boards 17 to the stringers, since there are no underlying parts. The top surface of the pallet is smooth because the special nuts 52 sink into the upper surface of the top boards as shown in Fig. 2. The bolt heads 51 serve as glides for the bottom of the pallet and hold the bottom boards out of contact with the floor when the pallet is skidded along the floor.

The corners of the pallet are rounded to reduce the chance for damage to the bottom boards, stringers and top boards when the pallet is dropped on its corner.

By construction of the pallet from specially constructed parts many important objects are instantly achieved; namely, a lighter pallet, a pallet approachable from all four directions instead of two, a pallet easily assembled and quickly repaired, and a pallet having great strength and durability.

The pallets made according to this invention may be of any convenient or expedient size. For shipments by railroad freight, and especially for frozen foodstuffs, it is preferred that the pallets have a load capacity of about 3,000 pounds, a length of 48 inches, a width of 40 inches, and a height of about 6 inches, with the various elements proportioned about as shown on the drawings. This size is best adapted to be placed in existing box cars, ships, warehouses, etc., with minimum loss of cube, and can be placed two abreast in trucks without exceeding the width limit on most state highways. Such a pallet weighs about 50 pounds when made of wood, as compared to about 80 pounds for conventional wooden pallets.

The specially constructed component parts can be prefabricated and stored or shipped to assembly or repair points where they can be used to build new pallets or to replace worn or damaged parts of old pallets. Moreover good parts of damaged or worn pallets can be salvaged by disassembling and later used as replacement parts.

It will also be clear from the drawings how completed pallets can be nested together for shipment or storage when they do not carry loads.

Some of the parts vary only in minor details from other parts, and by sacrificing some of their advantages these parts can be made the same, thus reducing the number of stock parts. For example, the parts 15 differ from the parts 16 and 17 only in being narrower, having rounded corners, and having the fastening means pass through them at relatively different points. By widening the parts 15 the points at which the fastening means pass through the parts 15, 16 and 17 could be made alike, then parts 15 would be interchangeable with parts 16 and 17. This would reduce the number of stock parts to five. Or if desired, only parts 16 and 17 could be made alike in the completed pallet, and part 15 left different. Similarly, the base parts 11 and 12 or the cross pieces 13 and 14 could be made interchangeable, so that the number of stock parts could be reduced to three, though the preferred embodiment is that illustrated and previously described.

The pallet could be made from plywood, Masonite, plastics, or even light metals, and there are other changes possible within the scope of this invention.

What is claimed is:

1. A load supporting pallet having clearance for lifting forks to engage beneath its top surface, including in combination the following replaceable units, a plurality of base-member units, each base unit having blocks permanently secured on its upper face at its ends and intermediate its ends, each block having on its upper face one part of a male and female connection; a plurality of cross-member units, extending at right angles to said base units and in alignment with the aforesaid blocks, each cross unit having blocks permanently secured on its under face at its ends and intermediate its ends, each block having on its lower face the other part of a male and female connection to interlock with the blocks on said base units; a plurality of top surface units, extending at right angles to said cross-member units, and arranged in alignment with the interlocked blocks; and a plurality of removable fastenings each passing through a base unit, cross unit and top unit for securing said units together, whereby any units damaged in use may be readily removed and replaced by new undamaged units and the pallet restored to service.

2. A load supporting pallet having clearance for lifting forks to engage beneath its top surface, including in combination the following replaceable units, a plurality of base-member units, each base unit having blocks permanently secured on its upper face at its ends and intermediate its ends, each block having on its upper face one part of a spline connection extending crosswise of said base unit; a plurality of cross-member units, extending at right angles to said base units and in alignment with the aforesaid blocks, each cross unit having blocks permanently secured on its under face at its ends and intermediate its ends, each block having on its lower face the other part of a spline connection to interlock with the spline part on each corresponding block on said base units; a plurality of top surface units, extending at right angles to said cross member units, and arranged in alignment with the interlocked blocks; and a plurality of removable fastenings each passing through a base unit, cross unit, and top unit for securing said units together, whereby any units damaged in use may be readily removed and replaced by new undamaged units and the pallet restored to service.

3. A load supporting pallet as set forth in claim 2 in which the blocks on the base member units are made of wood and have the grain running crosswise in relation to the long dimension of the base unit.

LOUIS A. BENOIST.
DAVID I. PURSLEY.

REFERENCES CITED

The following references are of record in the file of this patent:

UNITED STATES PATENTS

| Number | Name | Date |
| --- | --- | --- |
| 2,369,944 | Cahners | Feb. 20, 1945 |
| 2,371,106 | Lewis et al. | Mar. 6, 1945 |
| 2,371,878 | Cruickshank | Mar. 20, 1945 |
| 2,377,415 | Guignon | June 5, 1945 |